United States Patent [19]

Susnjara

[11] 4,127,431

[45] Nov. 28, 1978

[54] METHOD FOR ASSEMBLING A BACKER MEMBER TO A SHELL MEMBER

[75] Inventor: Kenneth J. Susnjara, Santa Claus, Ind.

[73] Assignee: Thermwood Corporation, Dale, Ind.

[21] Appl. No.: 842,790

[22] Filed: Oct. 17, 1977

[51] Int. Cl.$^2$ .............................................. B23Q 3/00
[52] U.S. Cl. ...................................... 156/282; 29/235; 29/464; 118/202; 156/293; 156/295; 156/322; 156/498; 156/499; 156/578
[58] Field of Search .............. 156/69, 293, 295, 303.1, 156/309, 311, 320, 323, 498, 499, 282, 322, 578; 29/464, 235, 450, 466; 118/200, 202

[56] References Cited

U.S. PATENT DOCUMENTS

| | | | |
|---|---|---|---|
| 3,056,984 | 10/1962 | Snitzer | 156/320 |
| 3,199,184 | 8/1965 | Harris et al. | 29/235 |
| 3,346,435 | 10/1967 | Beck | 156/69 |
| 3,490,978 | 1/1970 | Shockey et al. | 156/293 |
| 3,516,884 | 6/1970 | Heeter et al. | 156/293 |
| 3,751,876 | 8/1973 | Oakley et al. | 156/282 |
| 3,952,393 | 4/1976 | Ord et al. | 29/235 |

Primary Examiner—Jerome W. Massie
Attorney, Agent, or Firm—Barry L. Clark

[57] ABSTRACT

Hollow, thermoformed plastic shell members for use as panels and doors in the manufacture of cabinets and other furniture are easily and quickly assembled to rigid backing boards by guiding the boards, to which an adhesive edge coating of hot melt adhesive has been applied, into recesses in the shells. The guides comprise thin, resilient sheet metal members. A heated block at the inlet end of the guide path and a cooled block at the exit end result in the hot melt adhesive being properly applied and then quickly set.

7 Claims, 7 Drawing Figures

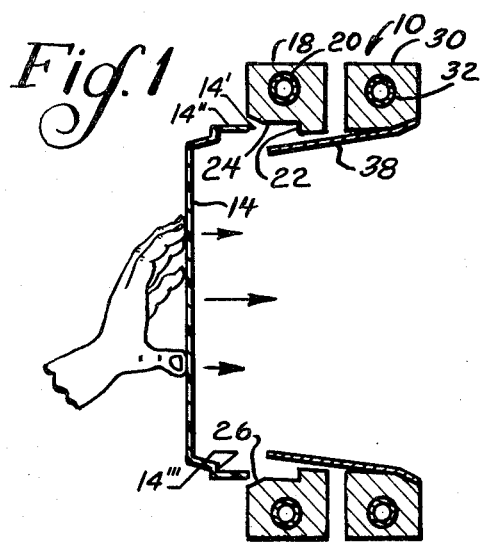
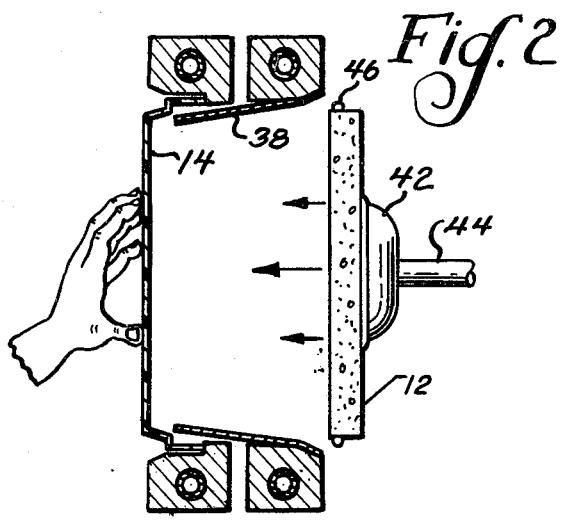
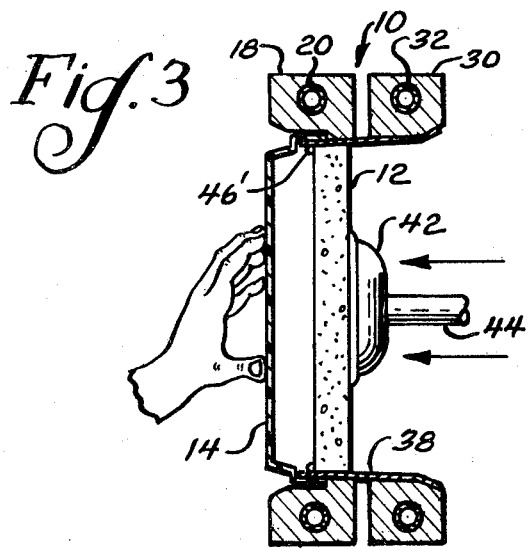
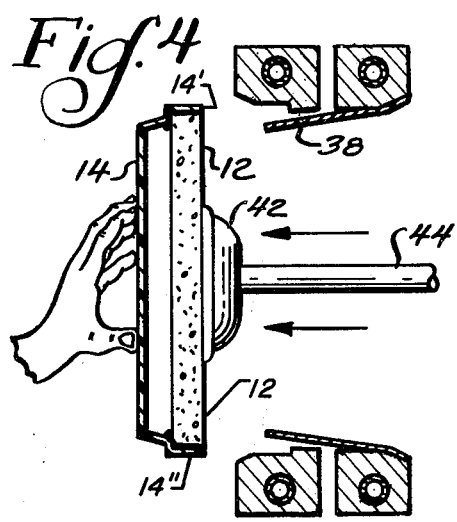
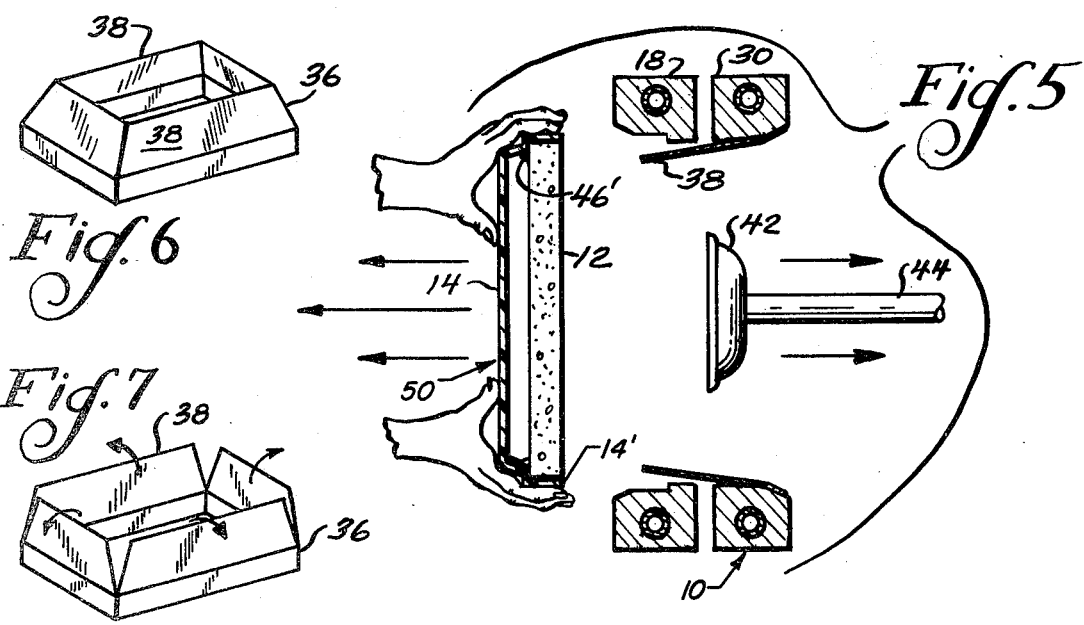
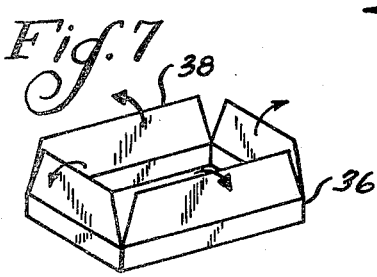

METHOD FOR ASSEMBLING A BACKER MEMBER TO A SHELL MEMBER

BACKGROUND OF THE INVENTION

The invention relates to the manufacture of laminated panels or doors for use in furniture such as cabinets and the like. In particular, the invention relates to the manufacture of inexpensive panel and door members which may have the appearance and weight of far more expensive materials such as hand carved hardwoods. The face and sides of the panels are formed through the action of heat and vacuum from flat relatively thin sheets of a plastic such as polystyrene so as to produce a three dimensional self-supporting shell which may include very fine detail such as wood grain. As noted in Susnjara U.S. Pat. No. 3,943,022, assigned to a common assignee, such thermoformed shells are bonded to rigid backing boards to achieve a desired stiffness or rigidity. Generally, a hot melt adhesive is applied to the inside of the shell and the backer is very carefully assembled into the recess in the back of the shell. If the resulting product is to have an appearance of the shell and backer being integral, it is important that the edges engage the backer tightly and that the adhesive be evenly distributed. Achieving proper assembly is most difficult and time consuming since the desired tight fit usually prevents one backer edge from being inserted into the shell if the opposite edge is permitted to move to the bottom of the shell recess. The loss of adhesive from the contacting edges during assembly can be prevented by squirting the adhesive between the edges with a pointed tip dispenser in a separate operation subsequent to assembly. However, such a secondary operation is time consuming, does not get the adhesive on the shell shoulder underlying the back member, and is not satisfactory in the corner areas where the tool cannot reach but where the plastic is most resistant to being fastened since it is quite stiff. Finally, the secondary hand gluing operation can result in the application of insufficient adhesive with poor bonding. On the other hand, the application of too much adhesive is not only wasteful but can permit adhesive to ooze out of the joint where it must be removed before the finished shell-backer assembly can be sanded and finished. If a very rapidly setting adhesive is used, the assembler has no extra time to get a balky backer into the shell recess so that the parts cannot be assembled correctly if the adhesive has already started to set. A slower setting adhesive allows more assembly time but also requires substantial clamping time to hold the assembled components until the adhesive has set.

SUMMARY

It is among the objects of the present invention to provide a method and apparatus for assembling a backer into a shell which is much faster than formerly used methods, is more economical, and which provides a better assembly.

The foregoing and other objects are attained by the present invention wherein an assembly apparatus comprising a heated frame and a cooled frame is positioned so that a plastic shell having a backer receiving recess can be moved into engagement with a recess in the cooled frame while a backer having hot melt adhesive on its edges is moved through a sheet metal guide in the heated frame into the backer receiving recess in the shell. The backer is then pushed further in the same direction until it forces the now assembled shell and backer out of the cooled frame, thereby withdrawing the sheet metal guides from between the edges of the backer and the edges of the shell. The continued movement of backers along the sheet metal guides causes one portion of the adhesive to be pushed ahead of the backer edges into the shell recess while another portion evenly coats the backer edges. The heated frame keeps any adhesive that remains on the guides from setting while the cooled frame helps set the adhesive as soon as the parts are assembled. The backers are preferably picked up by a vacuum holding member and pushed by it through the frame portions. The adhesive can be applied to the backer edges manually or automatically by a supply nozzle as the backer is held by the vacuum holding member. However, the details of the application of the adhesive to the backer form no part of the present invention.

BRIEF DESCRIPTION OF THE DRAWINGS

FIG. 1 is a cross-sectional view illustrating the assembly of a plastic shell member to a cooled frame;

FIG. 2 is a cross-sectional view illustrating the initial movement of a backer member toward the heated guide frame;

FIG. 3 is a cross-sectional view illustrating the last portion of the path of movement of the backer member into the plastic shell member;

FIG. 4 is a cross-sectional view illustrating the removal of the completed shell-backer assembly from the cooled frame;

FIG. 5 is a cross-sectional view illustrating the removal of the completed assembly from the vacuum holding plunger and the withdrawal of the plunger;

FIG. 6 is an isometric view of the spring metal guide member in its normal position as shown in FIGS. 1, 2, 4 and 5; and FIG. 7 is an isometric view of the spring metal guide member in its FIG. 3 expanded position.

DESCRIPTION OF THE PREFERRED EMBODIMENT

Referring to FIGS. 1–5 the operation of the assembly apparatus indicated generally at 10 is illustrated in the various stages of assembling a backer member 12 of flake board or other rigid material to a recess formed in the back of a relatively thin plastic shell member 14 which might be molded of polystyrene, for example, and have a thickness of approximately 0.080 inches. The apparatus 10 includes a rectangular cooled frame 18 of aluminum or other heat conductive material which is shown as containing a tube 20 which may circulate cooling fluid. The cooled frame 18 includes a seat or lip portion 22 and a sidewall portion 24 which engages the outer edge 14′ and sides 14″ of the shell member 14. A tapered lead-in portion 26 on the frame 18 facilitates the assembly of the shell 14 into the frame 18 where it is preferably positioned in the manner shown in FIG. 2. The apparatus 10 also includes a rectangular heated frame member 30 which may be heated by hot liquid or steam moving through tube portion 32. Alternatively, outside band heaters (not shown) could be attached to the outside of frame 30. A formed, spring metal guide member 36 having guide portions 38 which normally converge toward each other as shown in FIG. 6 is attached to the heating frame 30. A vacuum head 42 carried on a plunger shaft 44 is provided for moving the backer member 12 through the guide portion 38 and into contact with the plastic shell member 14. A bead of hot melt adhesive 46 is applied to the outer edge of the backer member (FIG. 2) before the backer member is moved into contact with the guide portion 38. This can be done by manually squirting the adhesive from a nozzle (not shown) as the vacuum head 42 is rotated or by mounting the vacuum head 42 so that it can index the backer member 12 so that each edge passes under a stationary nozzle (not shown).

Once the shell member 14 is in its FIG. 2 position, the vacuum head 42 carrying the backer 12 can be moved to the left from its FIG. 2 to its FIG. 3 position. This movement will cause the adhesive bead 46 to be partially wiped off onto the guide members 38 as the backer 12 slides over the surface of guide portions 38 and expands them outwardly. However, the portion of adhesive 46' removed during one assembly operation is pushed forward during the next so that an even coating is applied to every backer member except possibly the first one. The portion of adhesive 46' that is pushed forward serves to firmly bond the flat forward edge portions of the backer 12 to a recessed seat portion 14''' of the plastic shell 14.

The cooling frame 18 is preferably cooled to a temperature of less than 150° F. to keep the shell 14 from distorting and since various hot melt adhesives set at temperatures of about 160°-250° F. The heating frame 30 is heated to a temperature of about 300°-350° F. and would cause the frame 18 to get excessively hot if the latter frame were not cooled. The metal guide portions 38 may be of stainless steel or aluminum, for example, and of a thickness of about 0.020-0.030 inches. Since the conductive metal portion 38 is affixed to the heated frame 30 it will maintain the hot melt adhesive in good condition for bonding even though the adhesive is in contact with the relatively cool backer board 12. The cooling frame 18 will keep the shell cool despite the close positioning to the shell of the hot metal guides 38. The metal guides 38 will be momentarily cooled by contact with the cooling frame 18 during the short time interval that the backer board is moving through its FIG. 3 position. This happens since the guides 38 are expanded outwardly to their FIG. 7 configuration when contacted by the backer 12. The slight momentary cooling of the guides 38 serves to remove some of the excess heat in the hot melt bead 46 and insures an almost instantaneous bond as the completed assembly 50 of backer 12 and shell 14 is removed from the apparatus 10 (FIG. 5).

By the use of the thin guides 38 and the unique method of spreading the adhesive it is possible to size the shell 14 and backer 12 much closer to each other than if they had to be hand assembled or if adhesive had to be injected in the joint after assembly. Thus, a very good tight joint can be produced so that after the back face of the backer 12 and the edges 14' of the shell are sanded and finished it is almost impossible to determine that the assembly 50 is not a single, integral block of material.

I claim as my invention:

1. Method of bonding the side edges of a rigid backer member to a thin hollow plastic shell member to produce a laminated cabinet door or similar article comprising the steps of:

providing a shell member which includes rearwardly extending edge portions which define a recessed chamber which has internal dimensions only slightly greater than the external dimensions of the backer member;

providing first frame means for receiving the edge portions of said shell and second frame means having thin sheet metal guide means mounted thereon which extend into said recessed chamber internally of said edge portions when said shell is in said first frame, said sheet metal guide means having a coating of adhesive on its internal surfaces;

applying adhesive to the side edges of said backer member;

moving said backer member with said adhesive thereon in contact with said adhesive coated guide means toward said shell member until said backer member occupies said recessed chamber, said moving step causing a portion of the adhesive on the side edges of the backer member to be wiped off by the guide means while a portion of the adhesive coating already on the guide means will be wiped onto the leading edge of the backer member; and continuing to move said backer member and shell together relative to at least said second frame means to remove said guide means from the space between said shell edge portions and said side edges of said backer member.

2. The method of claim 1 wherein hot melt adhesive is applied to said side edges of said backer member.

3. The method of claim 2 wherein said second frame means is heated to a temperature higher than the set point of said hot melt adhesive.

4. The method of claim 3 wherein said first frame means is cooler than the set point temperature of said hot melt adhesive and the softening temperature of said plastic shell member.

5. The method of claim 3 wherein said first and second frame means are fixedly positioned relative to each other.

6. The method of claim 4 wherein said first frame means is maintained at a temperature of less than 150° F.

7. The method of claim 6 wherein said second frame means is maintained at a temperature of at least about 300° F.

* * * * *